Aug. 30, 1932.   G. SKINNER   1,874,646

LUBRICATOR FOR DIFFERENTIAL PINIONS

Filed July 20, 1931

Inventor,
George Skinner
By Frederick E. Bromley
Attorney

Patented Aug. 30, 1932

1,874,646

UNITED STATES PATENT OFFICE

GEORGE SKINNER, OF BIRCHCLIFFE, ONTARIO, CANADA

LUBRICATOR FOR DIFFERENTIAL PINIONS

Application filed July 20, 1931. Serial No. 551,874.

Various expedients have been devised for the purpose of lubricating the journals of differential pinions of automobiles and the like, but as far as I am aware these have not been wholly successful. The chief difficulty in supplying these parts with an adequate quantity of lubrication is that centrifugal force throws it off as the pinions bodily revolve about the axle. A system of lubrication then must provide for this condition in order to efficiently function.

According to the present invention, cups pick up oil as the differential revolves and urge it inwardly counter to centrifugal force. The pinion pin is hollow in order to provide a passage through which the oil is inwardly directed from both ends to channels leading to the journals of the pinions.

The pin preferably is fitted loosely in the housing and held against endwise movement by the cups that are located at the ends thereof.

This manner of lubrication enables a constant supply of oil to be fed to the moving parts, and the operation of the system is not adversely affected by high speeds.

Referring to the drawing, Figure 1 is a fragmentary section through the differential of an automobile showing the invention applied thereto.

Like numerals of reference indicate corresponding parts in each of the figures throughout the drawing.

Figure 1:
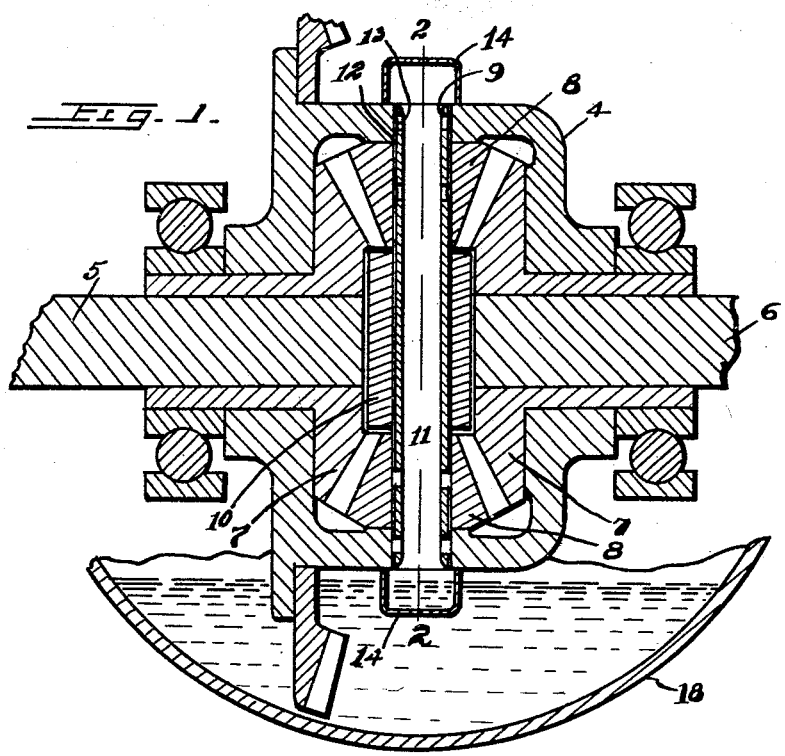
Figure 2:
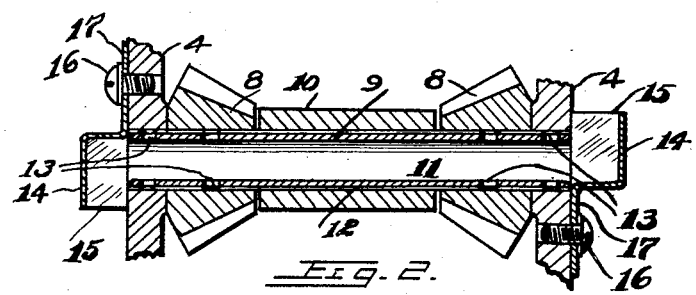
Figure 2 is a transverse section on line 2—2 of said figure.
Figure 3:
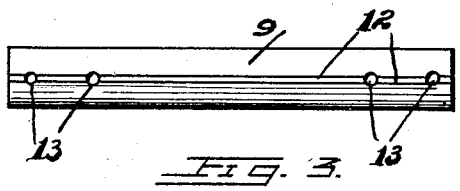
Figure 3 is a detail of the pin.

In the accompanying drawing, the reference numeral 4 denotes the usual differential housing of an automobile, which housing revolves about the axles 5 and 6 that are usually splined to the gears 7 meshed with the pinions 8. These pinions are idlers that freely revolve about the pin 9 and are spaced from each other by the member 10.

In carrying out the invention a hollow pin is employed having a substantial passage 11 extending from end to end. The pin is a working fit in the housing 4 as well as in the pinions 8, and has lengthwise oil grooves 12 communicating with the interior passage 11 by openings 13.

14 denotes the cups of which there are a pair, one being placed at each end of the pin and secured to the housing 4. Each cup communicates with the respective ingress of the passage 11 and is scoop-shaped as shown, being closed on all sides except the front 15. Suitable means are employed to secure the cups, such for example as screws 16 lodged in apertures in the lugs 17 and threadedly engaged with the housing 4. By using a single screw for each cup it serves as a pivot so that the cup may be swung aside to remove the pin. The cups serve to retain the pin in place, other means, however, may be substituted to this end if so desired.

It will be manifest that as the housing 4 revolves the cups scoop up oil from the housing or casing 18 and as the oil accumulates it is formed into the passage of the pin, and thence into the lubricating channels. Thus the pin and pinions are well supplied with oil that cannot be ejected by centrifugal force on account of the pressure of oil constantly being urged into the cups.

What I claim is:—

1. In a lubricator, the combination with a differential pinion pin having an oil passage therethrough, of means communicating with the ends of the pin and designed to scoop up oil as the differential revolves so as to force it into said passage.

2. In a lubricator, the combination with a differential pinion pin having an oil passage therethrough, of members communicating with the ends of the pin and designed to scoop up oil as the differential revolves so as to force it into said passage.

3. In a lubricator, the combination with a differential pinion pin having an oil passage therethrough, of cups communicating with the ends of the pin and designed to scoop up oil as the differential revolves so as to force it into said passage.

4. In a lubricator, the combination with a differential pinion pin having an oil passage therethrough, of scoop-shaped cups having openings forwardly directed with respect to the direction of rotation of the differential, said cups communicating with the pin ends so as to force oil into the passage thereof.

5. In a lubricator, the combination with a differential pinion pin having an oil passage therethrough, of means communicating with the ends of the pin and designed to scoop up oil as the differential revolves so as to force it into said passage, and securing means for said means.

6. In a lubricator, the combination with a differential pinion pin having an oil passage therethrough, of members communicating with the ends of the pin and designed to scoop up oil as the differential revolves so as to force it into said passage, and fastening elements for attaching the members to the pinion housing.

7. In a lubricator, the combination with a differential pinion pin having an oil passage therethrough, of cups communicating with the ends of the pin and designed to scoop up oil as the differential revolves so as to force it into said passage, and apertured lugs integral with the cups, said lugs having fastening elements lodged in the apertures to secure them to the pinion housing.

Signed at Toronto, Ontario, Canada, the 3rd day of July 1931.

GEORGE SKINNER.